INVENTOR.
P.U. WEBB

INVENTOR.
P.U. WEBB
BY Young & Quigg
ATTORNEYS

INVENTOR.
P.U. WEBB

United States Patent Office 3,451,895
Patented June 24, 1969

3,451,895
CONTINUOUS SAMPLING AND ANALYZING SYSTEM WITH LIQUID-VAPOR SEPARATOR AND FLOW MEASURING MEANS
Paul U. Webb, Bartlesville, Okla., assignor to Phillips Petroleum Company, a corporation of Delaware
Filed Jan. 23, 1967, Ser. No. 610,996
Int. Cl. B01d 3/42, 3/14
U.S. Cl. 196—132    11 Claims

ABSTRACT OF THE DISCLOSURE

A continuous sampling system having a liquid-vapor separating vessel which maintains a vapor or liquid sample at a predetermind temperature level different than the incoming sample temperature thereby separating same into liquid and vapor portions. A liquid level controller manipulating a positive-displacement metering pump maintains the liquid level in said vessel at a constant level. The portion of sample having boiling point higher than the predetermined temperature is determined by measuring the speed of said pump. The portion of sample having boiling point lower than the predetermined temperature is determined either by measuring the flow of the sample entering said vessel or by measuring the flow of vapors passing overhead from said vessel.

---

This invention relates to continuous sampling and analyzing systems for chemical processes. In another aspect, it relates to continuous sampling and analyzing systems for generating input data for computer systems controlling petroleum refining processes.

With the advent of the application of computer systems to control continuous chemical processes there has been an increased need for continuous sampling and analyzing systems for process streams. Process stream sampling and analzying systems are desired to continuously feed data directly and automatically to a computer system which carries out previously specified calculations. Based on these calculations, adjustments in the setting of process control equipment can be made for optimum performance of the unit processes. As applied to petroleum refining processes, and to the operation of fluid catalytic crackers and main fractionators, in particular, much remains to be done in sampling and analyzing techniques to maximize the potential improved performance from computer control of process variables.

To obtain maximum benefit of the computer system, the point in the process flow where the sample is taken is important. For instance, by sampling and analyzing the products in the riser of a reactor prior to flow into a main fractionator, instead of downstream of the main fractionator, conversion control of the reactor can be accomplished much faster, much easier and more effectively. A main fractionator lag time of about fifteen to thirty minutes can be eliminated by this upstream sampling and analysis. The necessary reactor and fractioner control changes can be made expeditiously thereby providing the capability for predictive control of the main fractionator, i.e., a feed forward system, and feedback control of the reactor. Optimization of the reactor and the main fractionator performance can be accomplished in substantially real time.

The make-up of the product desired to be analyzed at various points in the process flow makes it impossible to continuously sample and analyze this stream with conventional techniques. The sample may be in the form of either vapor or liquid dependent upon the point it is taken in the process flow. In order to analyze the composition of the sample and to determine the hydrocarbon conversion or yield of various end point materials in the stream, it is necessary to separate the lighter hydrocarbons from the heavier hydrocarbons in the stream. For instance, for an accurate analysis of the product stream in the riser of a reactor to determine the conversion of hydrocarbons in the gasoline range, it is necessary to separate the remainder of the materials from the sample which is in the form of vapor.

Accordingly, an object of this invention is to provide a method and apparatus capable of the continuous sampling and analysis of unit process streams either in vapor or liquid form.

Another object of this invention is to provide a method and apparatus capable of the continuous sampling and analysis of unit process streams and providing input data to a computer system which is automatically controlling a continuous chemical process.

Another object of this invention is to provide a method of and apparatus for the continuous sampling and analysis of the product stream in the riser of a reactor in a catalytic cracking process to determine the hydrocarbon conversion therein.

A further object of this invention is to provide a method of and apparatus for the continuous sampling and analysis of a main fractionator side draw stream to determine the yield of a particular end point specification material therein.

Further objects and advantages of this invention will become apparent to those skilled in the art from the following detailed description.

According to this invention, the sampling and analyzing system comprises a liquid-vapor separating means which includes a sample inlet conduit, a liquid outlet conduit and a vapor outlet conduit; a means for either partially condensing or partially vaporizing the sample (dependent upon whether the sample is in the form of vapor or liquid) at a substantially constant, predetermined temperature; a means for maintaining the liquid portion of the partially condensed or vaporized sample at a substantially constant level; a controllable means for withdrawing a liquid portion of the sample from the vessel; and a means for determining the quantity of the liquid and the vapor portions of the sample when partially condensed or partially vaporized at a predetermined temperature. By measuring or calculating the sample flow rate into the sampling and analyzing system, the flow rate of the overhead vapors passing out of the system and the withdrawal rate of the liquid from the system, the percentage of materials in the process stream with boiling points above and below the predetermined temperature can be determined.

Figure 1:
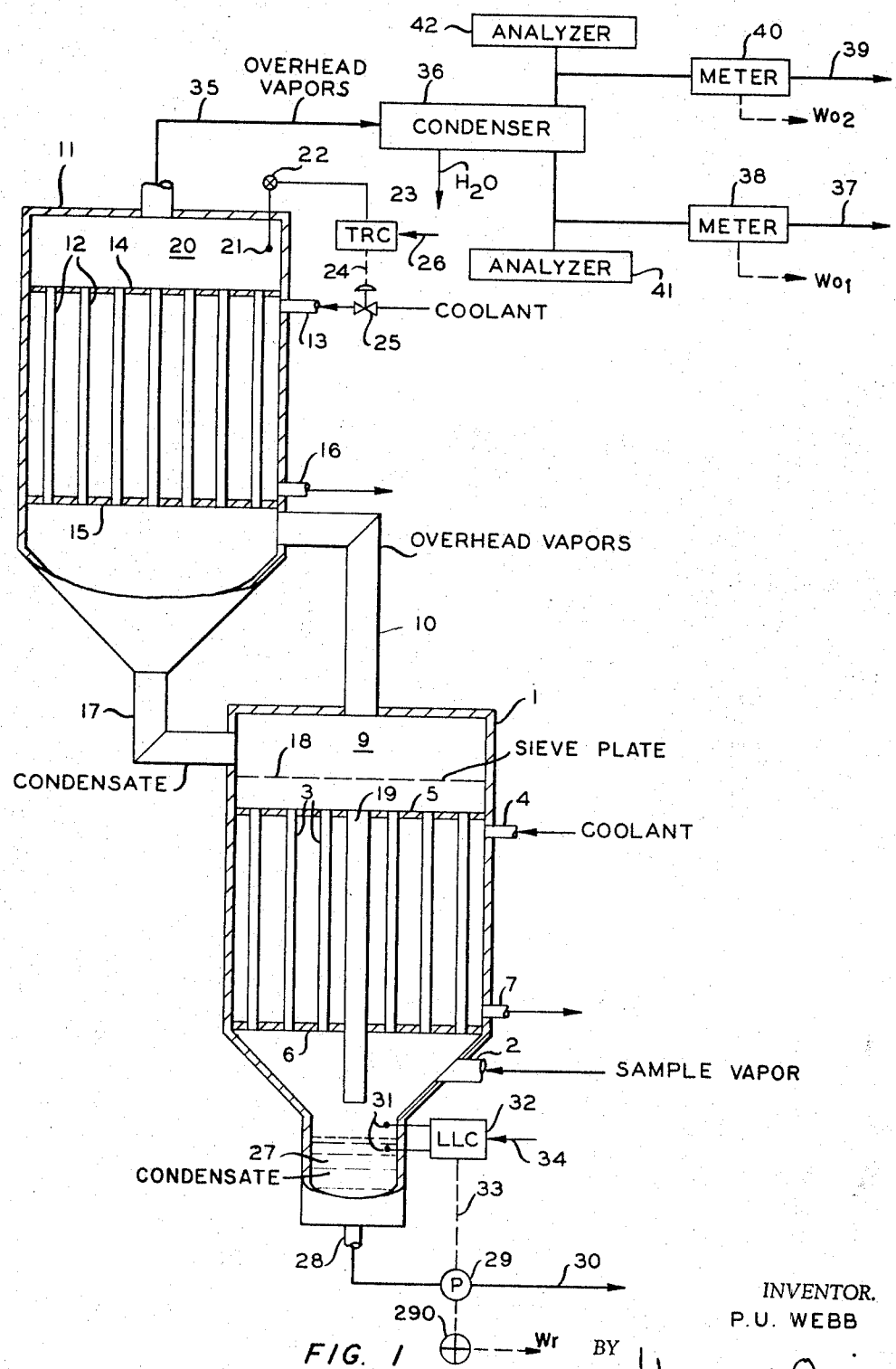
FIGURE 1 is a sectional diagrammatic view, in elevation, of an exemplary embodiment of this invention for sampling and analyzing a vaporous process stream.

Reference is made to FIGURE 1 which shows an exemplary embodiment of this invention for sampling and analyzing a vaporous process stream. Two partial condensers or dephlegmators in series are shown as a means for separating the vapor sample into liquid and vapor components for analysis. A vapor sample is flowed into the first partial condenser or dephlegmator 1 via simple inlet conduit 2 and rises up through tubes 3. A coolant is introduced into partial condenser 1 through inlet conduit 4, circulates around tubes 3 between baffle plates 5 and 6 and flows from 1 through outlet conduit 7.

This circulating coolant, which may be any conventional cooling media such as water or light oil, provides the initial cooling of the sample. The coolant is preferably cycled through a conventional cooling means, not shown, to maintain a substantially constant temperature thereof and is recycled back into the partial condenser 1 through inlet conduit 4. The temperature at which the coolant is maintained is dependent upon the sample being analyzed.

A portion of the sample, the materials with high boiling points, e.g. the heavier hydrocarbons in a catalytic cracking process, condenses within tubes 3 and the condensate droplets are collected in the bottom portion of partial condenser 1. The overhead vapors 9, the uncondensed portion of the sample, pass up through conduit 10 to second partial condenser or dephlegmator 11 and rises up through tubes 12.

A coolant, such as water, which is maintained at a known predetermined temperature by a means not shown, is introduced into second partial condenser 11 through inlet conduit 13, circulates around tubes 12 between baffle plates 14 and 15 and flows from second partial condenser 11 through outlet conduit 16. A portion of the overhead vapors condenses in tubes 12 and the condensate is returned to the first partial condenser 1 through reflux conduit 17 to interact with overhead vapors 9 rising up through tubes 3 in partial condenser 1. This reflux scrubs the higher boiling constituents from the overhead vapors, at the same time being stripped of a portion of its content of low boiling point materials, thereby effecting a precise separation of the low-boiling and the high-boiling components of the sample. The first partial condenser 1 may contain one or more sieve plates 18 to increase the efficiency of the liquid and vapor contact if required to obtain the desired separation.

The condensate from second partial condenser 11 passes downward through tubes 3 and internal conduit 19 and is collected in the bottom portion of first partial condenser 1. The temperature of overhead vapors 20 in second partial condenser 11 is sensed by thermocouple 21 disposed therein. Thermocouple 21 connects through transducer 22 to a conventional temperature recorder-controller 23 which is operatively connected by means, indicated by control line 24, with motor-driven valve 25, so that the flow of the coolant to the second partial condenser 11 through inlet conduit 13 is regulated to maintain the temperature of the overhead vapors 20 at a substantially constant level corresponding to the set point 26 on the controller. The predetermined temperature at which the overhead vapors 20 in the second partial condenser are maintained depends on the analysis desired. For instance, if the concentration of gasoline and lighter materials in a riser stream is desired, the set point 26 would be adjusted so that the overhead vapors 20 are maintained at about 430° F.

Condensate 27 is withdrawn from first partial condenser 1 through conduit 28 by a controllable metering pump 29, to which transmitter 290 productive of flow rate signal $W_r$ is operably connected, and may be returned to the system at a convenient point via line 30. The liquid level of condensate 27 in partial condenser 1 is monitored by liquid level sensors 31 disposed therein. Liquid level sensors 31 connect to a liquid level controller 32 which is operatively connected by means, indicated by control line 33 with metering pump 29, so that the speed of metering pump 29 is manipulated to maintain a substantially constant level of condensate in the partial condenser corresponding to set point 34 on the controller. Metering pump 29 is a positive displacement device which transfers a known volume of liquid during each revolution. The flow rate of the condensate withdrawn can be readily determined by measuring the speed of the pump by any conventional means, such as a tachometer (not shown).

With the sample separated into low-boiling point materials, the overhead vapors 20, and the high-boiling point materials, the condensate 27, it is possible to perform an analysis of the overhead vapors by any conventional means, such as a chromatographic analyzer, to determine the concentration of various constituents contained therein. Without this separation precise analysis of a vapor sample containing numerous constituents, by conventional means, is impossible. The data resulting from the analysis can be fed into a computer system to make any necessary process control changes required to obtain the desired product. For instance, if a sample is taken from a riser process stream and the overhead vapors are maintained at about 430° F., the overhead vapors will comprise gasoline and lighter materials. The concentration of the specific constituents, such as $C_5$ hydrocarbons, contained in the overhead vapors can be analyzed by a chromatographic analyzer and the data fed into a computer system which initiates any required process control changes.

The overhead vapors 20 pass from second partial condenser 11 through conduit 35 to condenser 36. In condenser 36 water is removed by a conventional water separation means (not shown) and the heavier and lighter hydrocarbons are separated for measuring flow as discussed hereinafter. The temperatures to which the overhead vapors are cooled in condenser 36 depends on the nature of the sample being analyzed.

The heavier hydrocarbons are passed from condenser 36 and may be introduced back into the process system at a convenient time via line 37 if desired. A turbine flow meter 38 disposed within line 37 measures the flow of the condensed heavier hydrocarbons. Any other conventional means for measuring liquid flow is acceptable. Uncondensed lighter hydrocarbons pass from condenser 36 and may be introduced back into the process system at a convenient point via line 39 if desired. A rotameter 40, disposed within line 39, measures the flow of the lighter hydrocarbons which are in the form of vapor. The total overhead vapor flow, exclusive of water, is the sum of the flows measured by flow meter 38 and rotameter 40 which are productive of flow rate signals $W_{o1}$ and $W_{o2}$ respectively.

A minute sample is tapped off line 37 and passed to chromatographic analyzer 41 which determines the concentration of various components in the heavier hydrocarbon stream. A minute sample is tapped off line 39 and passed to chromatographic analyzer 42 which determines the concentration of various components in the lighter hydrocarbon stream. In each analyzer, the eluted components appear in the effluent of the analyzer at definite intervals. The thermal conductivity of the mixture of each eluted component with the carrier gas is measured and an electrical voltage representative thereof is generated. The electrical signals can be recorded by any conventional means.

If an analysis of the overhead vapors is not required for any particular application of this invention, the flow rates of the overhead vapors may be measured without condensing the heavier hydrocarbons, however, the temperatures of the vapors must be maintained at an elevated temperature to preclude condensation in the conduits carrying the vapors up to the flow measuring devices. Because of the problems associated with the operation of instrumentation at elevated temperatures and the heating and insulation requirements to maintain the elevated temperatures, I prefer to use a condenser to separate the flows as shown in FIGURE 1.

With the overhead vapor flow rate known and the condensate withdrawal rate known, conversion of hydrocarbons which do not condense at the predetermined temperature can be determined from the following calculation:

$$\text{Percent conversion} = \frac{W_o}{W_r + W_o} \times 100$$

$W_o$ = flow rate of overhead vapors (sum of flow through line 37, $W_{o1}$ and flow through line 39, $W_{o2}$), lbs./sec.
$W_r$ = flow rate of condensed residue from sample withdrawn from 1 through metering pump 29, lbs./sec.

Figure 2:
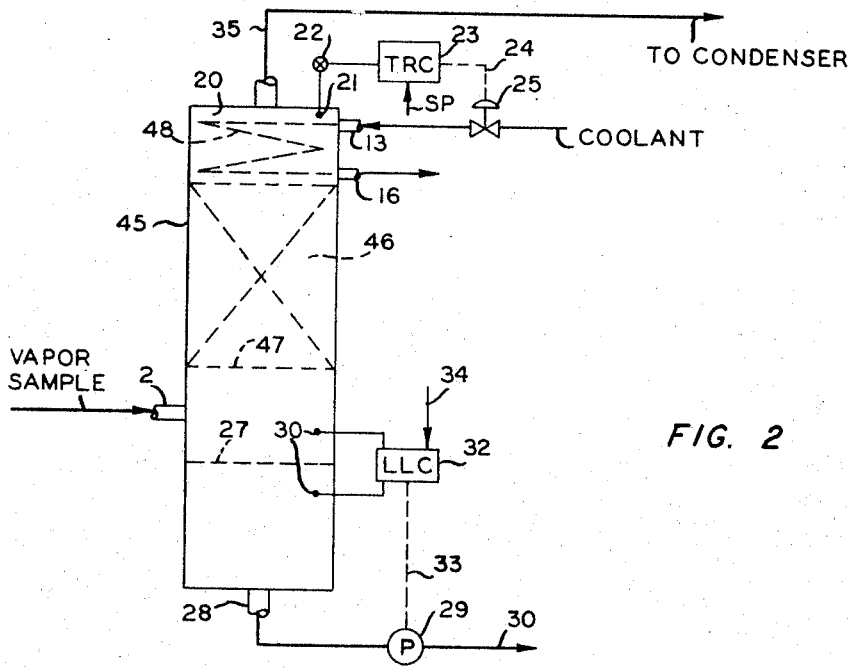
FIGURE 2 illustrates a modification to the sampling and analyzing system shown in FIGURE 1.

FIGURE 2 shows a minor modification to the sampling and analyzing system shown in FIGURE 1. In the embodiment shown in FIGURE 2 a small packed tower 45 is used as the liquid-vapor separating means rather than the two partial condensers 1 and 11 shown in FIGURE 1. All the common elements between FIGURES 1 and 2 have the same reference numerals. As shown in FIGURE 2, a bed of particulate contact material 46 contained within tower 45 is disposed on screen 47. The contact material may be constructed of metal, porcelain, ceramic material or any hard material inert to the sample stream passing through tower 45. The principle function of the contact material is to provide a coalescing or condensing surface for the high-boiling materials in the vaporous sample passing through the tower. The material may be in the form of balls, Raschig rings, saddles or contact material of any other shape which will perform this function.

A coolant is introduced into tower 45 through inlet conduit 13, circulates through cooling coil 48 disposed within tower 45 above contact material 46 and flows from cooling coil 48 through outlet conduit 16. A vapor sample is flowed into tower 45 via sample inlet conduit 2, rises up through contact material 46 and is cooled as it passes over cooling coil 48. A portion of the sample, the materials with high boiling points, condenses and the condensate 27 collects in the bottom section of tower 45. The overhead vapors 20, the uncondensed portion of the sample, pass through conduit 35 to condenser 36 of FIGURE 1. The means and methods for withdrawing and maintaining a constant liquid level of condensate 27, for controlling the coolant temperature and for measuring the flow and analyzing the composition of the overhead vapors are identical to that shown and described in reference to FIGURE 1.

Figure 3:
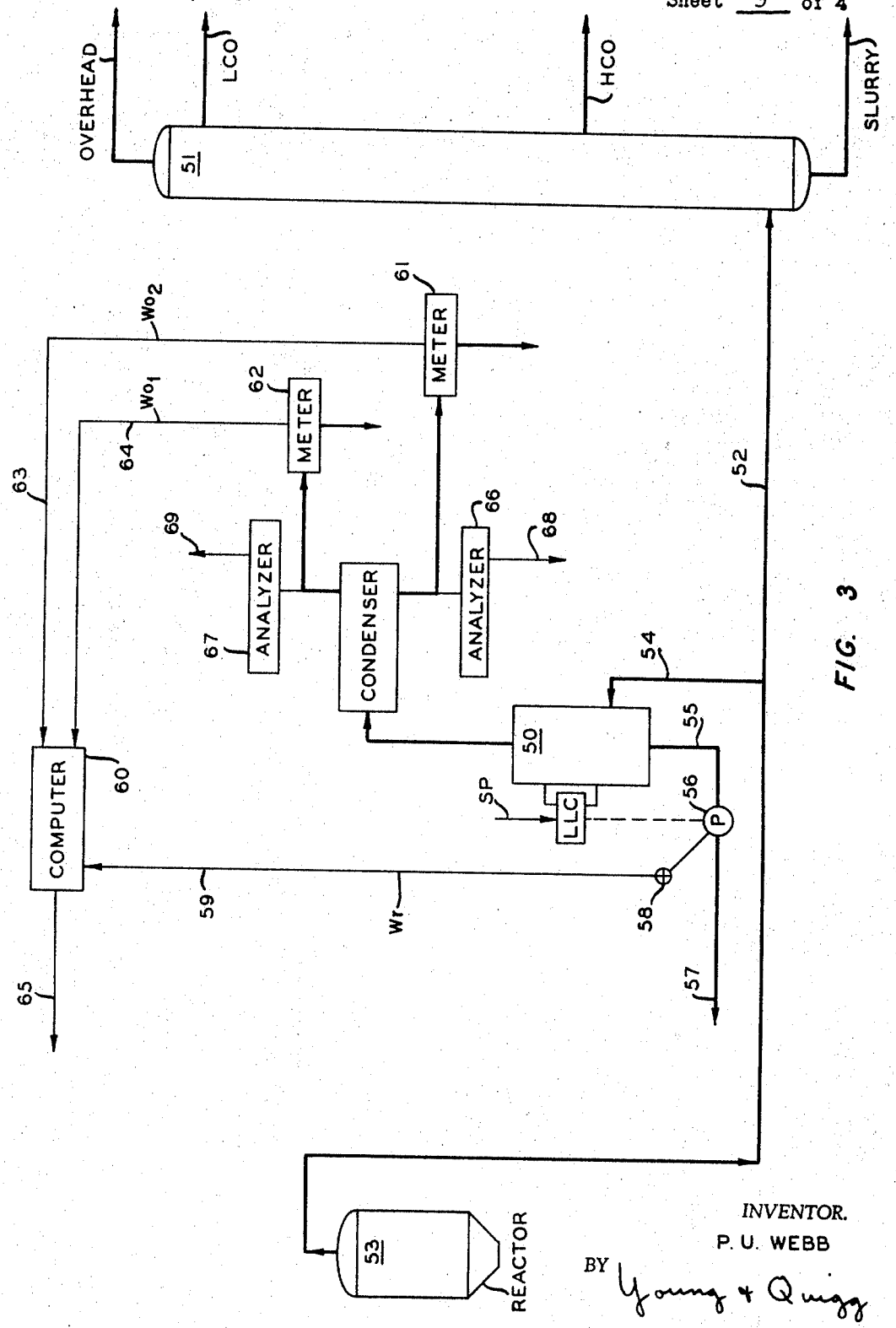
FIGURE 3 is a schematic diagram illustrating the use of the sampling and analyzing system shown in FIGURE 1, in combination with a reactor, chromatographic analyzer, and a computer, for providing input data to a computer system controlling a catalytic cracking process.

The sampling and analyzing system of my invention, as shown in FIGURES 1 and 2, can be used for generating input data to a computer system which is automatically controlling and optimizing the operation of a catalytic cracker as shown in FIGURE 3. The two partial condensers 1 and 11 of FIGURE 1 and the packed tower 45 of FIGURE 2 are represented schematically by 50. At a point upstream from main fractionator 51 a vapor sample is continuously withdrawn from riser 52 of reactor 53 through line 54, is flowed into 50 wherein it is cooled and maintained at a constant predetermined temperature, as previously described.

The condensate is withdrawn from 50 through outlet conduit 55 by metering pump 56. Metering pump 56 is manipulated to maintain a constant liquid level of the condensate in 50, as described previously. The condensate may be returned to the system at a convenient point (not shown) through line 57 if desired. The speed of metering pump 56 is measured by a transmitter 58, such as a tachometer, the resulting signal therefrom being readily correlatable with the condensate withdrawal rate from 50. The resulting signal from transmitter 58 is transmitted to a binary counter (not shown) within a percentage hydrocarbon conversion computing network 60 via signal line 59.

Signals representative of the overhead vapors flow rate, as measured by turbine flow meter 61 and by rotameter 62, are transmitted to percentage hydrocarbon conversion computing network 60 via signal lines 63 and 64, respectively. Computing network 60 takes the three measurement signals from lines 59, 63, and 64 and computes the conversion of hydrocarbons, which do not condense at the predetermined temperature in 50, in accordance with the equation described previously.

Network 60 produces a single output signal representative of the hydrocarbon conversion and this signal is sent to a computer system (not shown), which automatically controls and optimizes the operation of the catalytic cracker (not shown), via signal line 65. Signals representative of the concentration of various components contained in the overhead vapors are transmitted from chromatographic analyzers 66 and 67 to a computer system (not shown), which is automatically controlling and optimizing the operation of the catalytic cracker (not shown), via signal lines 68 and 69.

Figure 4:
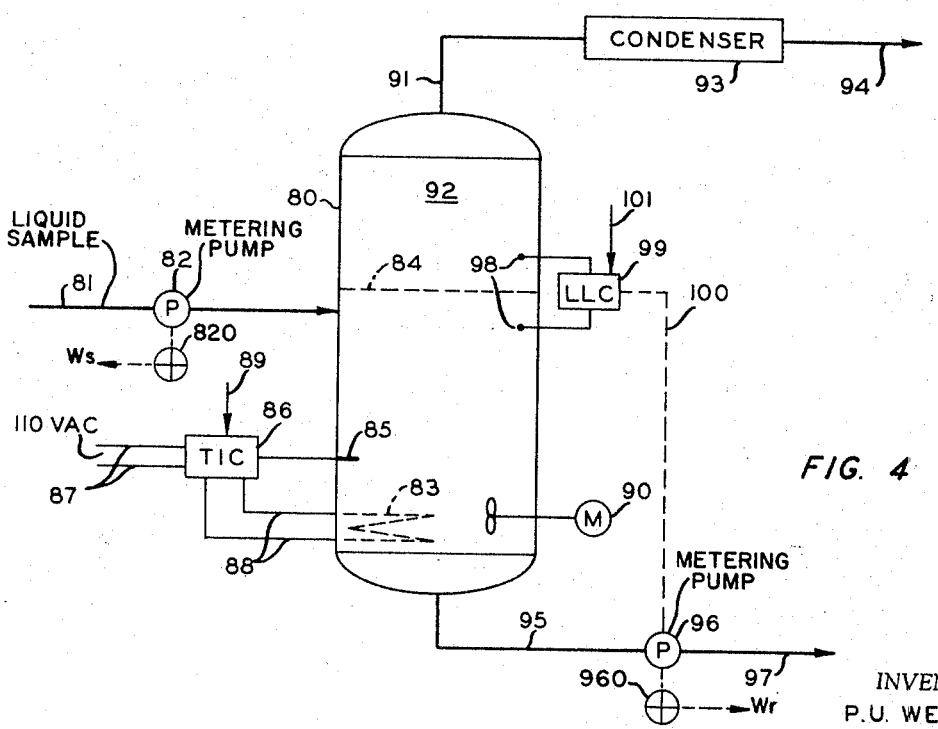
FIGURE 4 is a sectional diagrammatic view in elevation of an exemplary embodiment of this invention for sampling and analyzing a liquid process stream.

FIGURE 4 shows an exemplary embodiment of this invention for sampling and analyzing a liquid sample. A liquid sample is pumped into vessel 80 through inlet conduit 81 by metering pump 82, to which transducer 820 productive of flow rate signal $W_f$ is operably connected. Metering pump 82 operates to continuously pump the sample to be analyzed, at a known and constant rate, into vessel 80. Heater 83 disposed within vessel 80 operates, as described hereinafter, to increase the temperature of the liquid sample 84 contained within vessel 80 to a substantially fixed, predetermined temperature. Thermocouple 85 disposed within vessel 80 connects to a temperature controller 86 which is supplied with alternating current power for energizing the heater through electrical leads 87. Heater leads 88 are connected to the output or controlled side of the temperature controller 86. Thermocouple 85, which is responsive to the temperature of the liquid sample 84, actuates controller 86. This controller regulates the energization of heater 83 by an on-off signal so that liquid 84 is maintained at a substantially constant temperature corresponding to set point 89 on controller 86. A stirring mechanism 90 is provided in vessel 80 to agitate the liquid 84 thereby maintaining a substantially uniform temperature throughout.

The predetermined temperature selected depends upon the liquid charge being analyzed. For example, if the light cycle oil from a side draw of a main fractionator is being analyzed to determine the yield of gasoline and lighter end materials therein, the temperature of the vessel is maintained at about 430° F.

At any particular selected temperature, all hydrocarbons with a boil-off temperature less than that level vaporize and pass overhead through conduit 91. The overhead vapors 92 are cooled and condensed in condenser 93 and the distillate may be returned to the system at a convenient point via line 94 if desired. The undistilled residue from the sample, the heavier hydrocarbons with boiling points higher than the predetermined temperature, is withdrawn from vessel 80 through conduit 95 by a controllable metering pump 96, to which transducer 960 productive of flow rate signal $W_r$ is operably connected, and may be returned to the system at a convenient point via line 97 if desired. The liquid level of the undistilled residue in vessel 80 is monitored by liquid level sensors 98 disposed therein. Liquid level sensors 98 connect to a liquid level controller 99 which is operatively connected by means, indicated by control line 100, with metering pump 96, so that the speed of metering pump is manipulated to maintain a substantially constant level of liquid in the vessel corresponding to set point 101 on the controller. The flow rate of the undistilled residue withdrawn by metering pump 96 is determined by measuring the speed of the pump by ay conventional means, such as a tachometer (not shown).

Since the sample feed rate to the vessel is maintained constant by metering pump 82, the withdrawal rate of the undistilled residue from the sample is a direct measure of the percent distilled or boiled overhead at the predetermined temperature. A calculation of the flow rate of the overhead vapors 92 passing through conduit 91 is as follows:

$$W_o = W_s - W_r$$

$W_o$=flow rate of overhead vapors through conduit 91, lbs./sec.
$W_s$=flow rate of sample charge through metering pump 82, lbs./sec.
$W_r$=flow rate of undistilled residue from sample withdrawn from vessel 80 through metering pump 96, lbs./sec.

The yield of hydrocarbons in the stream being analyzed which have boiling points lower than the predetermined vessel temperature (the percentage of overhead vapors from the sample) is calculated as follows:

$$\text{Yield} = \frac{W_s - W_r}{W_s} \times 100$$

In the operation of main fractionators that separate converted hydrocarbons by the boiling point ranges, the rate of flow of side draw streams control the composition of the stream. To maximize the production of lighter, more valuable materials, it is desirable to control the side draw flow rate so that a minimum of the more valuable products are improperly withdrawn. For instance, if the light cycle oil side draw rate is too high, valuable gasoline and other lighter end point materials will be withdrawn with the light cycle oil.

Figure 5:
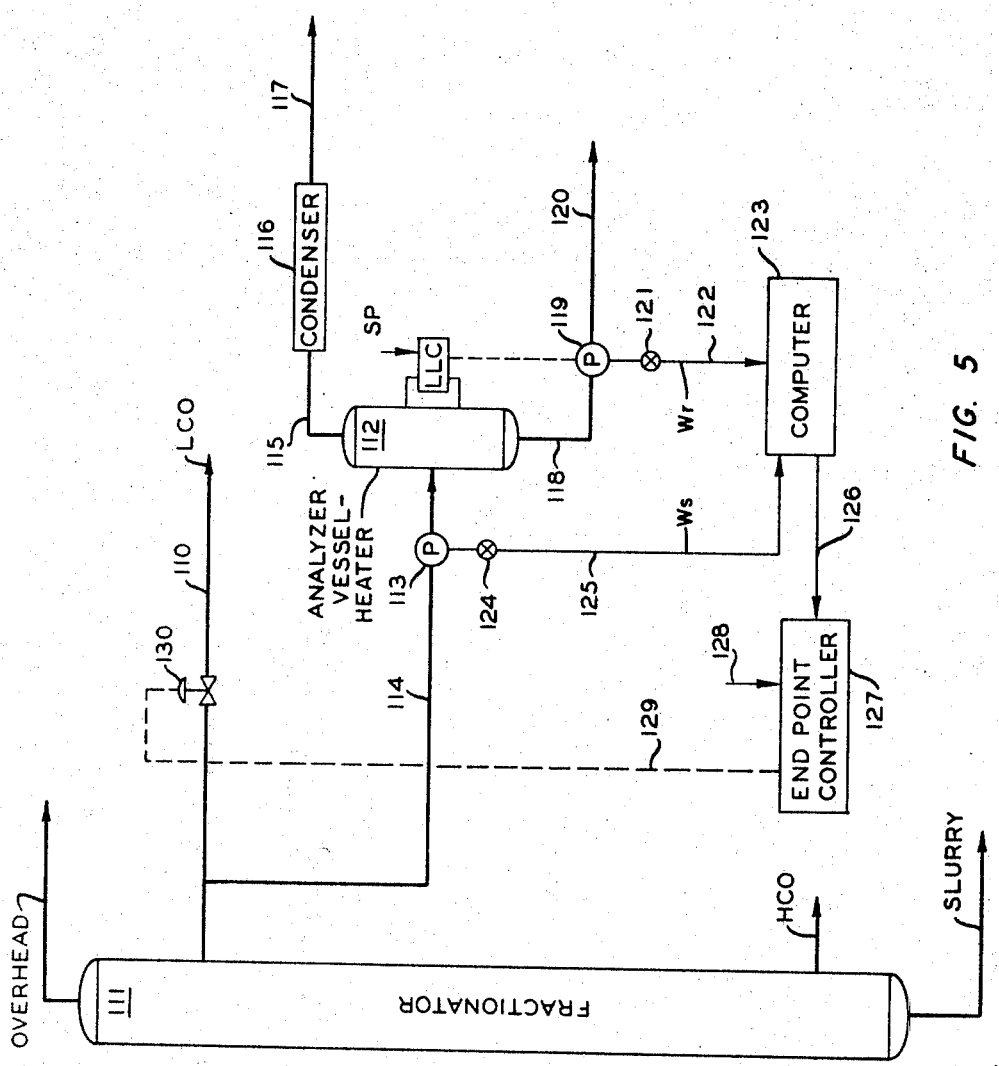
FIGURE 5 is a schematic diagram illustrating the use of the sampling and analyzing system shown in FIGURE 4, in combination with a computer, for controlling the flow rate of a main fractionator side draw stream in a catalytic cracking process.

The sampling and analyzing system shown in FIGURE 4 can be used to control main fractionator side draw streams as shown in FIGURE 5. A liquid sample is continuously withdrawn from the light cycle oil side draw stream 110, from main fractionator 111, and pumped into vessel 112, through conduit 114, by metering pump 113. The liquid sample is heated to and maintained at a constant predetermined temperature, as described previously, and a portion of the sample vaporizes. Vapors from the sample pass overhead from the vessel 112 through conduit 115, through condenser 116 and the condensate may be returned to the system at a convenient point (not shown) via line 117 if desired.

The undistilled residue is withdrawn from vessel 112 through conduit 118 by metering pump 119. Metering pump 119 is manipulated to maintain a constant liquid level in vessel 112 as described previously. The undistilled residue may be returned to the system at a convenient point (not shown) through line 120 if desired. The speed of metering pump 119 is measured by a transmitter 121, such as a tachometer, the resulting signal therefrom being readily correlatable with the undistilled residue withdrawal rate from vessel 112. The resulting signal from transmitter 121 is transmitted to a binary counter (not shown) within a percentage boilover computing network 123 via signal line 122. The speed of metering pump 113 is measured by transmitter 124, such as a tachometer, the resulting signal therefrom being readily correlatable with the liquid sample feed rate to vessel 112. The resulting signal from transmitter 124 is transmitted to a binary counter (not shown) within a percentage boilover computing network 123 via signal line 125.

The computing network 123 takes the two measurement signals from lines 122 and 125 and computes the percentage of boilover or yield of lighter hydrocarbons in the stream in accordance with the equation described previously network 123 produces a single output signal representative of the yield. This output signal is sent via line 126 to end point controller 127. A desired yield is preset by set point 128 on the controller 127, as determined by the products desired in the side draw streams. Controller 127 compares the output signal from the computer with the set point and obtains a control signal by conventional means, the magnitude of which is related to the difference between the signal from the computer and the set point. This control signal is transmitted via line 129 to motor-driven valve 130 which adjusts the light cycle oil side draw rate until the desired yield is obtained.

It should be understood that the sampling and analyzing system and method of operating same as described herein are applicable to any chemical process in which it is desirable to control process variables by analysis of a process stream which is effected by the process variables.

Certain modifications of the invention will become apparent to those skilled in the art and the illustrative details disclosed are not to be construed as imposing any unnecessary limitations on the invention.

I claim:
1. A continuous sampling and analyzing system comprising:
   (a) liquid-vapor separating means having a sample inlet conduit, a liquid outlet conduit and a vapor outlet conduit connected thereto;
   (b) temperature-changing means for changing the temperature of material within said separating means, the magnitude of the temperature change being sufficient to separate said sample into liquid and vapor phases;
   (c) means responsive to the temperature of one phase of said sample for controlling said temperature-changing means to maintain said one phase of said sample at a substantially constant, predetermined temperature;
   (d) means responsive to the liquid level of the liquid phase of said sample for controlling the rate of liquid withdrawal through said liquid outlet conduit to maintain a substantially constant liquid level in said separating means;
   (e) means for establishing a first signal $W_r$ which is representative of the liquid withdrawal rate;
   (f) means for establishing a second signal $W_o$ which is representative of the flow rate of overhead vapors passing through said vapor outlet conduit; and
   (g) means responsive to said means for establishing to provide a control signal which is representative of the quantity

$$\frac{W_o}{W_r + W_o} \times 100$$

2. The sampling and analyzing system of claim 1 wherein said means for establishing said first signal is a controllable metering pump and said means for determining flow of the liquid withdrawal rate is a means for measuring the speed of said pump.

3. The sampling and analyzing system of claim 2 for a vapor sample wherein said temperature-changing means comprises a cooling means and said temperature responsive means comprises a temperature sensing means sensing the temperature of the vapor phase of said sample.

4. The sampling and analyzing system of claim 3 for a vapor sample wherein said vapor flow rate-determining means comprises flow measuring means measuring vapors passing through said vapor outlet conduit.

5. The sampling and analyzing system of claim 3 for a vapor sample wherein said separating means comprises at least one partial condenser.

6. The sampling and analyzing system of claim 3 for a vapor sample wherein said separating means comprises a packed tower.

7. The sampling and analyzing system of claim 2 for a liquid sample wherein said temperature-changing means comprises a controllable heating means and said temperature-responsive means comprises a temperature sensing means sensing the temperature of the liquid phase of said sample.

8. The sampling and analyzing system of claim 2 for a liquid sample wherein said separating means comprises a distillation vessel.

9. The sampling and analyzing system of claim 8 for a liquid sample wherein said vapor flow rate-determining means comprises, in addition to said metering pump for determining liquid withdrawal rate, a second controllable metering pump continuously flowing the liquid sample to be analyzed into said separating means and a means for measuring the speed of said second pump.

10. Apparatus comprising:
  (a) a main fractionator adapted to separate products of fluid catalytic cracking of petroleum oils by boiling ranges having side draw stream conduit means;
  (b) liquid-vapor separating means comprising a vessel which includes a sample inlet conduit connected to an intermediate region of said vessel, a liquid bottoms outlet conduit and an overhead vapor outlet conduit;
  (c) conduit means communicating between said side draw conduit means and said sample inlet conduit;
  (d) flow control means disposed within said sample inlet conduit for continuously flowing a liquid sample from said side draw conduit means into said separating means;
  (e) controllable heating means for elevating the temperature of said liquid sample to the boiling point of a portion of the materials contained therein;
  (f) means responsive to the temperature of the liquid phase of said sample for controlling said controllable heating means to maintain said sample at a substantially constant temperature;
  (g) controllable means in said liquid outlet conduit for withdrawing liquid from said separating means;
  (h) means responsive to the liquid level of said sample for controlling said controllable liquid-withdrawing means to maintain a substantially constant liquid level in said separating means;
  (i) means for measuring the liquid flow rate, $W_r$, through said liquid-withdrawing means;
  (j) means for measuring the liquid flow rate, $W_s$, of said sample being introduced into said separating means;
  (k) means for controlling the rate of flow in said side draw conduit means;
  (l) means for establishing and for transmitting signals representative of said $W_r$ and $W_s$ measurements;
  (m) means comprising a computer for computing the yield of hydrocarbons in said draw stream conduit means from said $W_r$ and $W_s$ measurements; and
  (n) control means responsive to a signal derived from said computer for adjusting said side draw conduit control means thereby regulating the hydrocarbon yield to attain a preselected level.

11. The apparatus of claim 10 wherein said flow control means comprises a metering pump.

References Cited

UNITED STATES PATENTS

| | | | |
|---|---|---|---|
| 2,900,334 | 8/1959 | Miller | 196—132 X |
| 2,965,549 | 12/1960 | Hudkins | 203—2 |
| 3,002,818 | 10/1961 | Berger | 196—132 X |
| 3,096,274 | 7/1963 | Palmer | 196—132 X |
| 3,259,554 | 7/1966 | Constantikes | 62—21 X |
| 3,212,997 | 10/1965 | Walker | 203—2 |
| 3,359,185 | 12/1967 | Matta. | |
| 3,336,205 | 8/1967 | Rijnsdorp et al. | 208—350 X |

OTHER REFERENCES

Hydrocarbon Processing and Petroleum Refiner: February 1963, pages 117–121 incl.

NORMAN YUDKOFF, *Primary Examiner.*

F. E. DRUMMOND, *Assistant Examiner.*

U.S. Cl. X.R.

73—61.1; 196—139; 202—160, 181; 203—1, 2, 3; 208—103, 350